United States Patent [19]
Gray

[11] 4,367,917
[45] Jan. 11, 1983

[54] MULTIPLE SHEATH CABLE AND METHOD OF MANUFACTURE

[76] Inventor: Stanley J. Gray, 8502 E. 121st St., Bixby, Okla. 74008

[21] Appl. No.: 223,244

[22] Filed: Jan. 8, 1981

Related U.S. Application Data

[62] Division of Ser. No. 112,933, Jan. 17, 1980, Pat. No. 4,317,003.

[51] Int. Cl.³ .............................................. G02B 5/14
[52] U.S. Cl. .................................................. 350/96.23
[58] Field of Search ................. 350/96.23; 174/105 B, 174/109, 106 R

[56] References Cited
U.S. PATENT DOCUMENTS
4,239,336 12/1980 Parfree et al. ................. 350/96.23

FOREIGN PATENT DOCUMENTS
2604766 8/1977 Fed. Rep. of Germany ... 350/96.23
2018454 10/1979 United Kingdom ............ 350/96.23

*Primary Examiner*—John D. Lee
*Assistant Examiner*—Frank Gonzalez
*Attorney, Agent, or Firm*—Head, Johnson & Stevenson

[57] ABSTRACT

A multiple sheath cable for telemetry, heating and communications and methods of manufacturing such cable in long lengths with high tensile strength. The telemetry and communications cable may be of the wire type for conducting electrical signals or fiber optics for conducting laser or other optical signal, the conductors being typically insulated by mineral insulation material or organic insulation material. These insulated conductors are provided with concentric multiple layers of metal tubular sheaths having staggered weld joints for increasing tensile strength while protecting the conductors and the insulation from extreme environmental conditions such as heat, pressure and corrosion.

5 Claims, 14 Drawing Figures

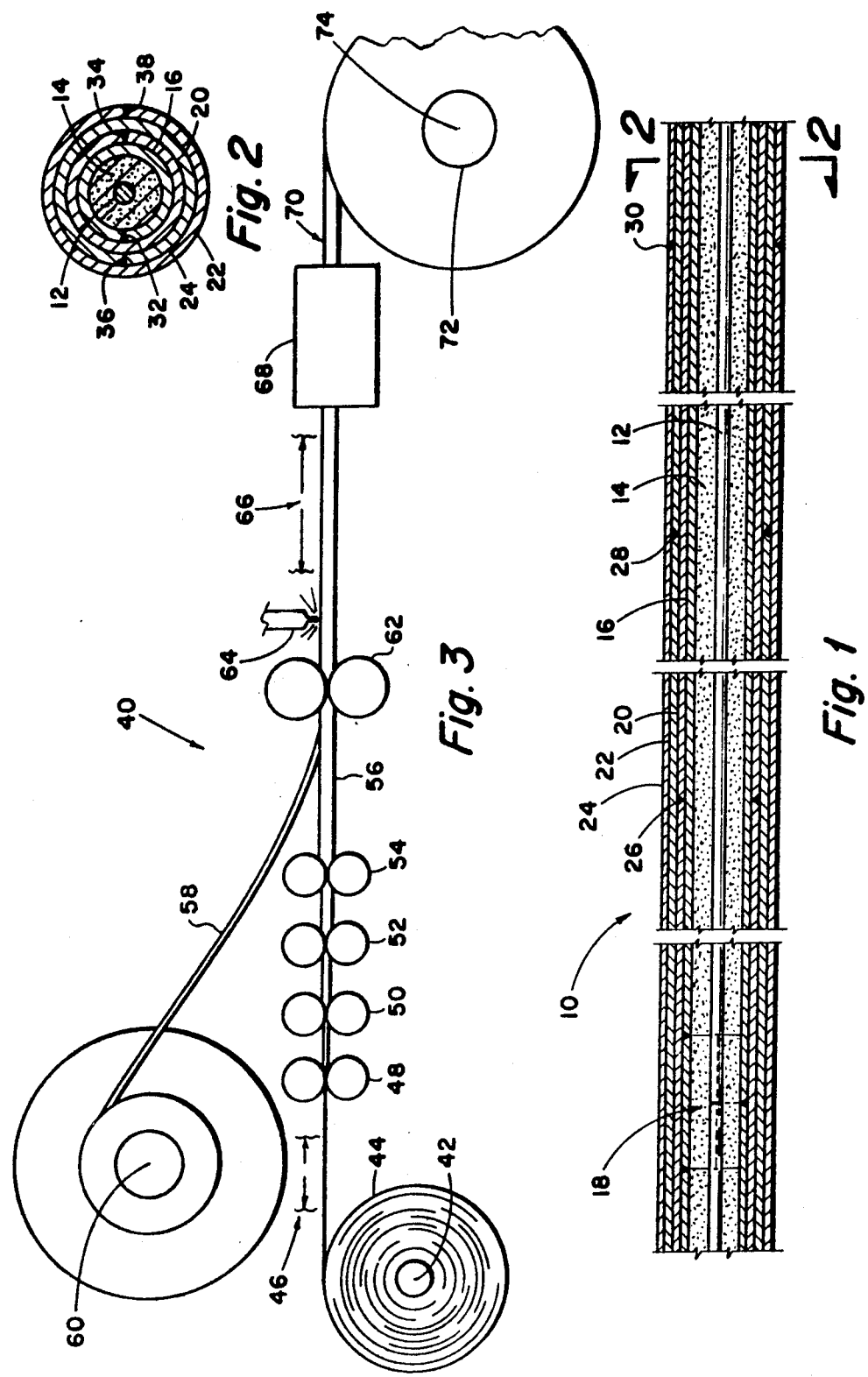

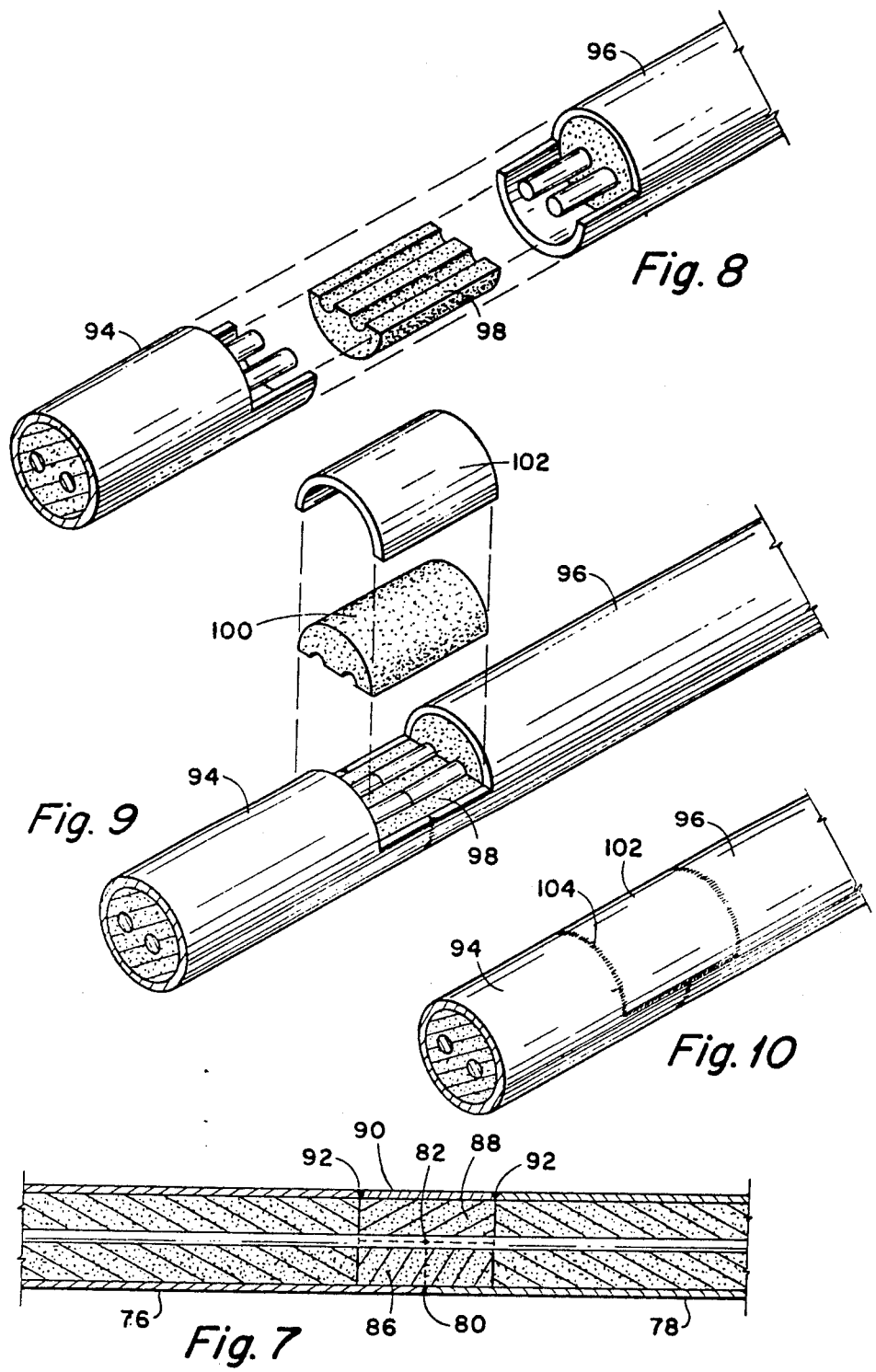

MULTIPLE SHEATH CABLE AND METHOD OF MANUFACTURE

This is a division of application Ser. No. 112,933, filed Jan. 17, 1980, now Pat. No. 4,317,003.

BACKGROUND OF THE INVENTION

1. Field of the Invention

The present invention relates to electrical and fiber optic cables and methods of manufacturing such cables in long single lengths by providing a multiple sheath with staggered weld joints for increased strength and environmental protection.

2. History of the Prior Art

In the drilling and maintenance of deep oil wells and geothermic wells, it is necessary to periodically lower temperature and pressure probes, gauges and other telemetry equipment into the well to take bottom hole measurements.

Since some of these wells are at depths ranging from 15,000 to 40,000 feet, the tensile strength of the telemetry cable must be extremely high to support the weight of the equipment in addition to the weight of the cable due to the length thereof. Further, the cable may be exposed to extreme temperatures, pressures and highly corrosive materials while inside the well.

The cables that could be used for such deep well logging are of the stainless steel jacketed mineral oxide type cables typically used as heater cables as taught in U.S. Pat. No. 4,137,762, issued Feb. 6, 1979 to William D. Smith.

However, present methods of manufacture of such cable result in cables of limited length. These limitations in length are primarily due to the limited lengths of available strip stock material being used. Further, in order to jacket cable with material such as stainless steel, the strip stock must be rather thin so that it can be bent around the wire and the insulation. This use of relatively thin material will not yield the necessary tensile strength for such deep hole telemetry operations.

Further, if ordinary splicing techniques are used, the tensile strength at the splice joint is less than that of the cable itself and hence can give rise to localized failures.

Also, in the manufacture of such cables shorter lengths naturally occur due to random weld failures along the sheath seam which leaves holes in the seam requiring the cable to be cut at that point. This cutting at relatively short lengths is quite acceptable in the heater cable usage since often there is a use for short cables but would be totally unacceptable in producing telemetry cable for deep hole weld logging operations.

Recently, a second need for long cable lengths with high tensile strength has developed in the form of fiber optic communications cable. Telephone companies are now experimenting with fiber optic lengths in excess of one mile and which are to be buried in trenches thereby subjecting the cable to harsh environments.

Such cables must have considerable tensile strength due to the handling of the long lengths thereof and while high temperatures are not normally present in such usage, other environmental conditions exist such as corrosive earth environments and heavy lateral loads which might tend to crush the cable.

Since it is very difficult to splice fiber optic bundles and since such material exhibits a relatively low tensile strength, it would be necessary to jacket the cables with a protective sheath having high resistance to corrosive surroundings, high tensile strength and resistance to crushing lateral loads.

Still another use for metal jacketed cable is for the protection of power cables in extreme environments where reliability is essential.

SUMMARY OF THE INVENTION

The present invention provides a multiple sheath cable and a method of manufacturing the cable in extremely long continuous lengths with high tensile strength and to provide the protection necessary to overcome the problems hereinbefore set forth.

The present invention provides a method of splicing metal-jacketed mineral insulated cable and a design and method for reinforcing the sheath joints by multiple sheath layering techniques.

Another object of the invention is to provide a multiple layered sheath for protecting fiber optic cable and organic insulated wires.

In the case of mineral insulated cables, cable segments manufactured in a conventional manner are spliced together using a design and method which does not create an appreciable increase in diameter of the splice joint. This is basically accomplished by trimming back a portion of the steel jacket from the abutting ends of two cable segments and then removing the insulation from that open portion to expose the conductor or conductors therein.

The conductors and the abutting end portions of the steel jacket are then joined by welding or soldering techniques thereby leaving a window area open at the splice joint. Mineral insulation of a flowable consistency is poured into the open area to cover the conductor wires or may be inserted in the form of shaped molded insulation blocks.

The open window then is covered by a shaped segment of stainless steel tube material and welded into place thereby forming a splice joint of substantially the same diameter as the cable segments.

After the total desired cable length has been made up and wound onto a drum, the cable may be drawn or roll reduced to pack the insulation in and about the splice joints. The cable then may be cleaned and treated with a sealant or bonding agent.

This finished cable length is then run through a sheathing machine or tube mill which will form another sheath over the original sheath. This is typically done by seam welding. During the application of the second sheath it may be necessary to splice the metal strip prior to being wrapped around the original, care being taken so that each splice joint is a good distance from any splice joint in the original sheath. It is felt that a minimum of ten meters between splice joints of successive wraps for most small cables would be sufficient.

After the second layer of sheathing has been added, the cable may be drawn or roll reduced very tightly onto the original sheath. Also during the application of this second sheath, weld flaws might occur. The weld quality is monitored and weld flaws should be patched prior to the drawing or roll reduction of the second sheath.

More subsequent layers of sheathing material may be added in the same manner as hereinbefore set forth. When drawing or roll reducing the cable in carrying out the steps hereinbefore set forth, it may be necessary to anneal the sheath to prevent too much work hardening which could cause breaking or cracking. The finished cable may then be drawn or roll reduced to increase tensile strength or to meet production size requirements.

In the sheathing of cables having optical fibers or plastic insulated conductors, the weld patching of the sheath or annealing might damage the materials inside the cable and hence those steps would have to be eliminated.

The manner of multiple sheathing such cables would be either to manufacture a continuous length of such cable in the desired length or splice together cables which are adaptable for such splicing such as plastic insulated conductor cable prior to the adding of the first metal sheath which typically would be stainless steel.

After the desired length of cable has been made up, the cable could be cleaned and coated with a sealing material such as an anaerobic adhesive or heat sensitive or pressure sensitive adhesive. The cable is then run through a sheathing machine or tube mill which will form a steel jacket with a seam weld. Experimentation has shown that the speed of welding in such a sheathing machine or tube mill is sufficient to prevent localized heat which would damage the insulation material in the original cable.

This original sheath may then be roll reduced or drawn in order to provide a tight-fitting steel jacket around the insulated cable.

The outside surface of this cable may then be cleaned and provided with a suitable sealant or bonding coating to prepare for the application of the second sheath. If weld flaws occur during the application of the second sheath, the weld quality should be monitored and unwelded joints or holes should be patched with a semi-flexible sealant such as silicon rubber or solder which can be applied without damage to the cable or the insulation in the cable. This patching is done just prior to the drawing or roll reduction.

More subsequent layers of sheathing material may be added in the same manner as hereinbefore described, always staggering the weld joints to insure that no two weld joints occur at the same longitudinal location.

Since the tensile strength to weight ratio of stainless steel is rather high, for most practical applications several layers of stainless steel may be added in order to provide a tensile strength high enough to be able to safely lower equipment into deep well bores with the assurance that the equipment will not be lost due to cable breakage and with the further assurance that there will be sufficient resistance to temperature, pressure and corrosion to protect the conductor wires.

On the other hand, in protecting fiber optics or plastic coated conductors which would normally not be used in deep well operations due to temperature restrictions, the added tensile strength is not so much to support the weight of long lengths of cable but to be able to handle such long lengths of cable during trenching operations with added assurance of not encountering breakage which gives rise to an unwanted splice joint.

Further, in the use of fiber optics or conductor cable which is used for power or communications, where high reliability is essential, the multiple stainless steel sheathing serves to protect the cable against corrosive environments after it has been laid.

DESCRIPTION OF THE DRAWINGS

Other and further advantageous features of the present invention will hereinafter more fully appear in connection with a detailed description of the drawings in which:

FIG. 1 is a side sectional view of a multiple sheath cable embodying the present invention.

FIG. 2 is an end sectional view of the cable of FIG. 1 taken along the broken lines 2—2 of FIG. 1.

FIG. 3 is an elevational schematic view of a machine for applying multiple sheathing under the teachings of the present invention.

FIG. 7 is a side sectional view of the finished splice joint of the cable of FIGS. 4, 5 and 6.

FIGS. 8, 9 and 10 are perspective views of cable segments showing a splice joint where two conductors are present in the cable.

DESCRIPTION OF THE PREFERRED EMBODIMENTS

Figure 4:
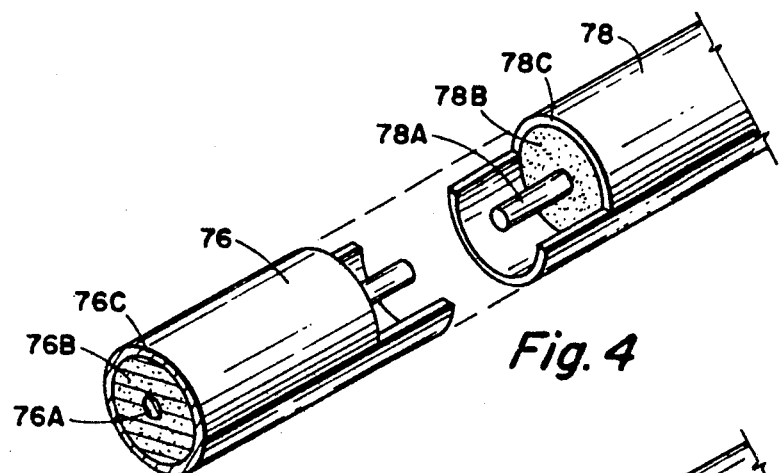
FIGS. 4, 5 and 6 are perspective views of a mineral insulated cable section depicting the method of splicing said cable.

Referring to the drawings in detail, reference character 10 generally indicates a multiple sheath cable which in this case depicts a single conductor 12 surrounded by mineral insulation such as magnesium oxide 14, which in turn is surrounded by a stainless steel first sheath member 16. FIG. 1 of the drawings, at reference character 18, depicts a splice joint in the mineral insulated cable which will be hereinafter more fully described.

Second, third and fourth tubular metal sheaths 20, 22 and 24 are also shown in FIG. 1, each depicting at least one butt-welded splice joint 26, 28 and 30, respectively. As will be hereinafter set forth, it is desirable in the practice of the present invention that the butt-welded splice joints 26, 28 and 30 be longitudinally spaced with respect to the cable so that none of the splice joints are superimposed over another adjacent splice joint. It is further noted that each of the sheath members 16, 20, 22 and 24 are all seam-welded at 32, 34, 36 and 38, respectively.

It is further desirable that the seam-weld lines also be staggered so that one seam-weld does not fall directly over another adjacent seam-weld as shown in FIG. 2. Further staggering of these seam-welded joints may be accomplished by the way in which the cable is rolled and handled between successive applications of sheaths.

Referring now to FIG. 3 of the drawings, reference character 40 generally indicates a sheathing machine or tube mill which may be used for not only applying the first layer 16 of sheathing but may also be used and is shown here as being used to apply a subsequent layer of sheathing to already prepared cable.

The machine 40 generally comprises a spool 42 for carrying strip stock stainless steel 44 thereon. The strip 44 is payed off the spool 42 and may be spliced in the area indicated at 46 in order to obtain the desired lengths. This splicing is typically accomplished by a butt-weld and which shows up in the finished cable as the butt-welds 26, 28 and 30.

The stock 44 is then fed through a plurality of forming rollers 48, 50, 52 and 54 wherein the edges of the material are rolled up to form a trough so that the strip stock exits the forming rolls 54 with a substantially U-shaped cross-section at 56 for receiving a strip of cable material 58 therein.

The cable material 58 is payed off of a spool 60 which is located above the tube mill and may be substantially any size depending on the amount of cable to be carried thereby. This cable may be in the form of steel jacketed mineral oxide cable as shown in FIG. 1 or may be any form of cable covered by a mineral insulation or an organic insulation such as plastic.

After the cable 58 enters the trough-shaped sheath material 56, the combination enters closing rollers 62 which closes the stainless steel sheath into a tubular configuration and while being held in a closed position, the seam is continously welded by the welding device 64 which may be a tungsten inert gas welder or other suitable welding machine. It has been found that the combined cable and sheath may move through the tube mill 40 fast enough that the seam-welding accomplished by the welding device 64 does not appreciably raise the temperature of the sheath to damage the cable being closed therein. Hence, if the inner cable 58 happens to have an organic insulation such as plastic or in the case of fiber optic material, insulated by plastic, no damage is done within the cable. However, if the cable 58 is of the mineral oxide steel jacketed type, the heat would be of little significance.

After the seam has been welded, it should be monitored to detect any weld flaws so that such weld flaws may be patched in the area generally indicated by reference character 66.

In the case of mineral insulated cable the patch can be accomplished by welding techniques whereas if the interior cable 58 is of a plastic insulation or insulation subject to damage by heat, the patching should be done by way of a semiflexible sealant such as silicone rubber or solder which can be applied without damage to the interior cable.

After necessary repairs are made where weld flaws occur, the cable passes through a tube reducing device 68 which can be in the form of a draw dye or reducing rollers to compress the outer sheath material 44 in firm engagement with the cable 58 carried therein. After the cable has been roll reduced or drawn to be reduced in the device 68, it may be desirable to provide an annealing operation at 70 or by the use of a separate facility in order to prevent damage due to work hardening. However, annealing would not be permissable where the insulation is plastic. In either case, the cable may then be rolled onto a suitable spool 72.

It can readily be seen that the spool 72 might have its axis 74 located at substantially any angle with respect to the vertical plane containing the tube mill in order to stagger the seam weld joints 32, 34, 36 and 38 in any desired manner. Opposing weld joints as shown in FIG. 2 may be accomplished by simply inverting the spools between successive applications of sheathing material.

Typically one would probably either have adjustable rollers in a single tube mill machine or have three or four tube mill machines having different sized rollers for the application of the subsequent layers of stainless steel sheathing on the cable.

Referring now to FIGS. 4 through 7, reference characters 76 and 78 represent end segments of a mineral insulated single wire conductor which are to be spliced together to form an initial desired length of cable. Both of the cables 76 and 78, for the purpose of this example, contain a central conductor wire 76A surrounded by mineral insulation 76B which in turn is surrounded by a steel jacket or sheath 76C. Likewise, the cable 78 has a central conductor 78A surrounded by mineral insulation 78B and again which is surrounded by a stainless steel sheath 78C. A portion of the sheaths 76C and 78C are cut away and the mineral insulation contained therearound is removed thereby leaving exposed a portion of the sheaths 76C and 78C and the conductor wires 76A and 78A as shown in FIG. 4.

Figure 5:
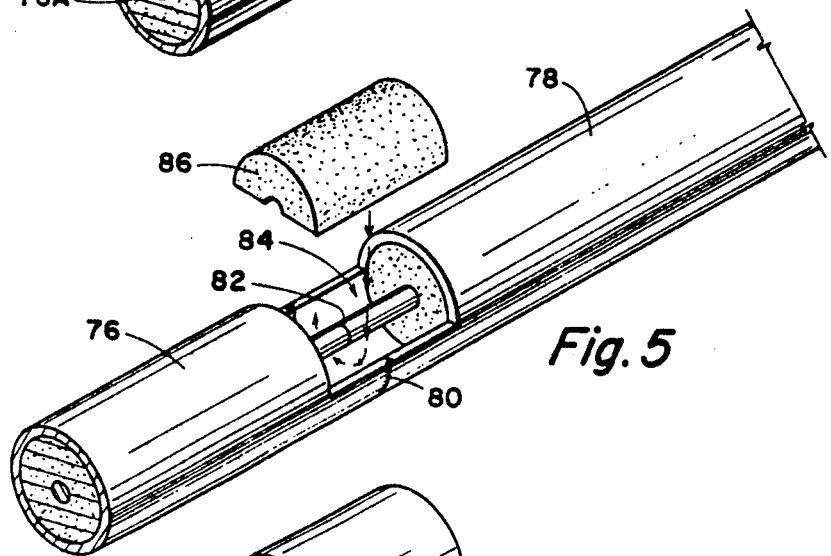

The ends of the sheath are then butted together as shown in FIG. 5 and provided with a butt-weld indicated by reference character 80 and wherein the ends of the conductors 76A and 78A are joined by either welding or soldering at reference character 82. This leaves a window area generally indicated by reference character 84 which exposes the inside of the adjoining sheath and the conductor. A half cylinder molded block 86 of insulation material may then be inserted into the window area 84 as shown in FIGS. 5 and 6 and rotated into the bottom portion thereof as shown in FIG. 6.

Figure 6:
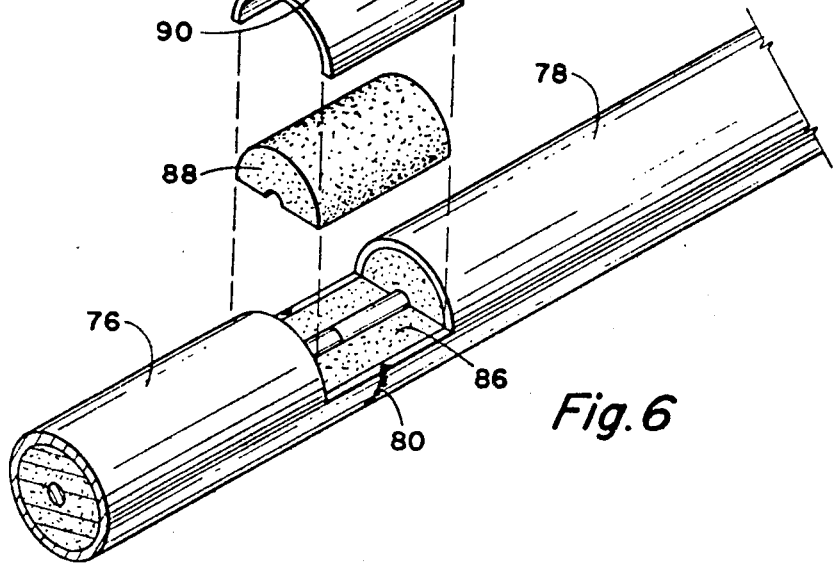

A second similar molded block 88 of insulation material may then be lowered into place to finish filling the window area 84 as shown in FIG. 6 and covered by a section of stainless steel tube stock 90. This piece of tube stock 90 then is welded in place to close the window area 84 and to form a splice joint which will not appreciably change the diameter of the cable. FIG. 7 then shows a sectional view of the splice joint which is similar to the section 18 as shown in FIG. 1. But which also depicts the weld joint 92 at the plate member 90. FIGS. 8, 9 and 10 depict a method of splicing segments 94 and 96 of a two-conductor cable wherein a first molded piece of insulation 98 is inserted into position within the window area before the segments 94 and 96 are butted together for welding. A possible problem that could be associated with this process would be the requirement of welding or soldering the conductor ends together when they are in contact with the molded insulation piece 98. A second molded insulation block 100 then is inserted into place to completely fill the window area and is covered by a piece of tubular stock 102 which is cut to fit over the window area for subsequent welding into place as shown in FIG. 10 by reference character 104.

Figure 11:
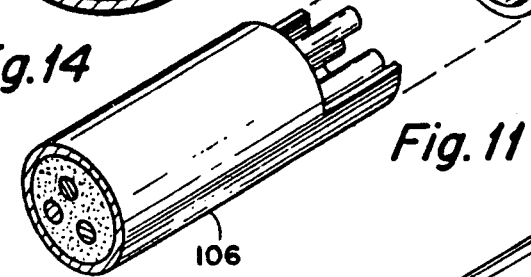
FIGS. 11, 12 and 13 show perspective views of a three-conductor cable splice joint.
Figure 12:
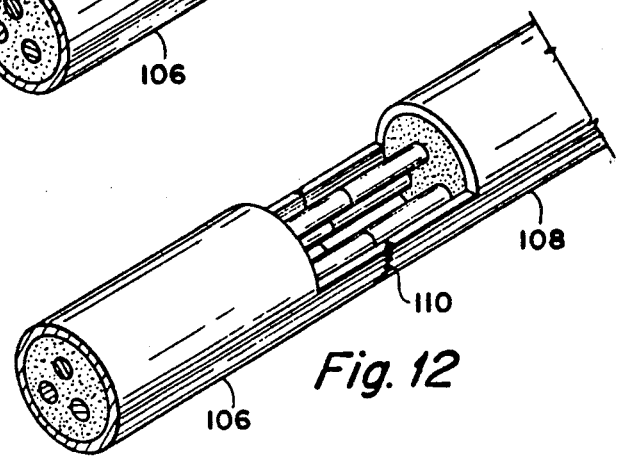
Figure 13:
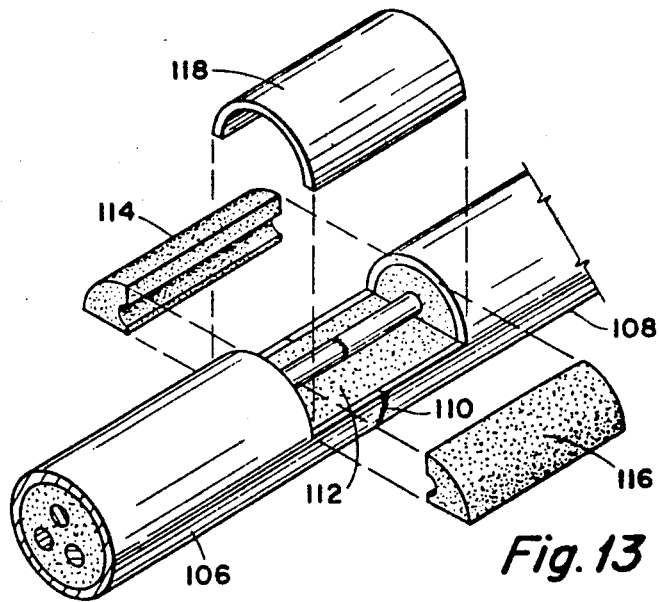

Referring to FIGS. 11, 12 and 13, three conductor cables 106 and 108 may be joined by forming the window as hereinbefore set forth and butting the cable ends together, butt-welding the sheath at 110 and soldering or welding the wire segments together. Insulation material then of a flowable nature such as granular insulation or insulation in a solution, may then be poured into the open window area and thereby the window area is filled with such insulation at 112 as shown in FIG. 13. Molded blocks 114 and 116 may then be inserted to finish filling the window area. The window area may be thereafter capped with a suitable piece of stock material 118 and welded in place.

It should be pointed out that after the splice has been accomplished by the methods hereinbefore set forth, it may be necessary to pass the cable through a roll reducing or draw dye in order to compact the insulation around the splice joints and throughout the cable.

Figure 14:
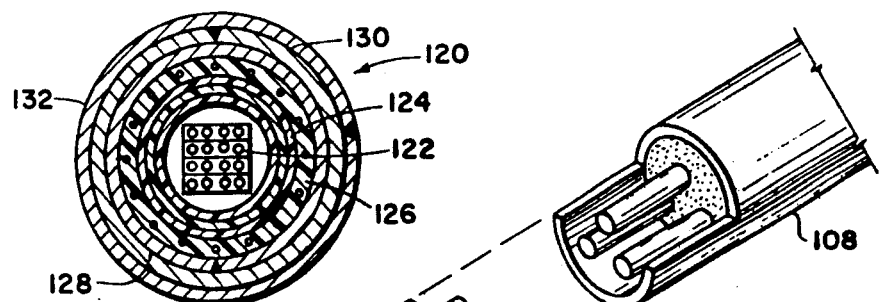
FIG. 14 depicts an end sectional view of a fiber optic bundle having a multiple metal sheath embodying the present invention.

Referring now to FIG. 14, reference character 120 generally indicates a fiber optic cable having multiple metal sheaths. Often the fiber optics cable is provided in an array 122 which is then covered by a plurality of plastic insulation sheaths generally indicated by reference character 124. In this particular case, the outer surface of the cable is covered by a reinforced plastic sheath 126.

In order to further reinforce this cable, it is passed through a tube mill or sheathing machine whereby a layer of stainless steel sheathing 128 is applied in the manner as hereinbefore set forth and possibly by a machine such as the tube mill 40 of FIG. 3.

Additional layers of sheathing 130 and 132 may also be applied as hereinbefore set forth, taking care to stagger the weld joints and to not expose the cable to localized temperatures which would cause melting of the plastic sheathing.

As hereinbefore set forth, seam welding may be accomplished by a continuous tube mill 40 without damage to the insulation material. However, where localized heating may occur during patching or repairing by welding techniques, suitable cool patching techniques should be accomplished as hereinbefore set forth.

From the foregoing, it is apparent that the present invention provides a multiple sheath cable having greatly enhanced tensile strength for protection of the conductors whether they be electrical conductors or fiber optic conductors, against corrosion and pressure. The foregoing also provides splicing techniques which are effective in the splicing of mineral insulated cable in preparation for applying the multiple stainless steel sheaths for increased strength and protection.

Whereas the present invention has been described in particular relation to the drawings attached hereto, other modifications apart from those shown or suggested herein may be made within the spirit and scope of the invention.

What is claimed is:

1. A multiple sheath cable comprising at least one elongated fiber optic conductor element surrounded by insulation material, a first tubular metal sheath tightly surrounding said insulation material and conductor element, said metal sheath comprising a plurality of elongated segments butt-welded to form spaced splice joints, said joints having diameter substantially equal to the diameter of the tubular sheath, at least one subsequent tubular metal sheath tightly surrounding said first tubular metal sheath and comprising a plurality of elongated segments butt-welded to form spaced splice joints, none of said second or subsequent splice joints being superimposed over the splice joint of the next preceding sheath.

2. A multiple sheath cable as set forth in claim 1 wherein each tubular metal sheath is seam-welded.

3. A multiple sheath cable as set forth in claim 1 and including a sealant and bonding agent between successive sheath layers.

4. A multiple sheath cable as set forth in claim 3 wherein the sealant and bonding agent is a soldering agent.

5. A multiple sheath cable as set forth in claim 3 wherein the sealing and bonding agent is copper plating.

* * * * *